US006259678B1

(12) United States Patent
Christian et al.

(10) Patent No.: US 6,259,678 B1
(45) Date of Patent: Jul. 10, 2001

(54) TELECOMMUNICATIONS TERMINALS MANAGEMENT

(75) Inventors: Daniel M. Christian, Allen; Thomas M. Wierzbicki, Arlington, both of TX (US); Jonathan A. Thompson, Newbury (GB)

(73) Assignee: Alcatel USA Sourcing L.P., Plano, TX (US)

( * ) Notice: Subject to any disclaimer, the term of this patent is extended or adjusted under 35 U.S.C. 154(b) by 0 days.

(21) Appl. No.: 09/001,066

(22) Filed: Dec. 30, 1997

(51) Int. Cl.$^7$ ................................................. H04L 12/28
(52) U.S. Cl. .............................................. 370/254; 710/8
(58) Field of Search ........................ 710/8–9, 10, 15–19, 710/102, 103; 370/216, 217, 221, 225, 241–243, 252, 254, 257; 709/223, 224; 713/100

(56) References Cited

U.S. PATENT DOCUMENTS

| | | |
|---|---|---|
| 5,105,421 | 4/1992 | Gingell . |
| 5,267,309 | 11/1993 | Sanders et al. . |
| 5,274,767 * | 12/1993 | Maskovyak ............................ 710/16 |
| 5,889,965 * | 3/1999 | Wallach et al. ....................... 710/103 |
| 5,940,586 * | 8/1999 | Bealkowski et al. .................... 714/5 |
| 5,974,474 * | 10/1999 | Furner et al. ............................ 710/8 |
| 5,982,767 * | 11/1999 | McIntosh ............................. 370/352 |
| 6,003,077 * | 12/1999 | Bawden et al. ....................... 709/223 |
| 6,012,095 * | 1/2000 | Thompson et al. ................... 709/231 |
| 6,041,306 * | 3/2000 | Du et al. ................................... 705/8 |
| 6,067,093 * | 5/2000 | Grau et al. ............................ 345/440 |

FOREIGN PATENT DOCUMENTS 2 202 062   9/1988  (GB) .

OTHER PUBLICATIONS

W.P. Arvidson, "A Generic Operations System Interface to Support the Next Generation of Digital Loop Carrier System", IEEE Journal on Selected Areas in Communications, vol. 6, No. 4, May 1988, pp. 677–684.

H. Sticker, "Network Monitoring and Analysis (NMA)—An Advanced Network Monitoring Tool", GlobeCom, vol. 3, Dec. 1–4, 1986, pp. 1290–1294.

A. Hermann, "Phamos—Philips Advanced Management and Operations System—Functionality and Architecture", Philips Telecommnication Review, vol. 51, No. 1, Mar. 1, 1993, pp. 30–42.

* cited by examiner

*Primary Examiner*—David Vincent
(74) *Attorney, Agent, or Firm*—Fish & Richardson P.C

(57) ABSTRACT

Methods and systems for telecommunications terminals management that include at least one telecommunications terminal and an attached computer. The telecommunications terminal generates messages describing the telecommunications terminal (e.g. card insertion or removal and terminal alarms) either autonomously or in response to automatically generated requests. The computer processes these messages to build a model of connected telecommunications terminals. The model can be a hierarchy of software objects where objects are inserted and modified based on the message produced by the telecommunications terminal. The computer can display the model information to an administrator. The administrator can interact with the model to alter properties of the telecommunications terminals represented.

23 Claims, 4 Drawing Sheets

TELECOMMUNICATIONS TERMINALS MANAGEMENT

BACKGROUND

This invention relates to telecommunications terminals.

Telecommunications terminals connect subscriber lines, such as POTS (Plain Old Telephone Service) and ISDN (Integrated Services Digital Network) lines, to telecommunications exchanges and other telecommunications equipment. A terminal includes channel unit card slots that accept channel unit cards. Channel unit cards convert analog and digital signals from subscriber lines into formatted digital data signals. Different types of channel unit cards service different types of subscriber lines (e.g. POTS or ISDN). The terminal constructs a single time division multiplexed (TDM) signal from several channel unit cards' formatted digital data signals for transmission to remote telecommunications equipment. The terminal also demultiplexes TDM signals received from remote telecommunications equipment to deliver formatted digital data back to the channel unit cards which then convert the formatted digital data into a form suitable for transmission over subscriber lines.

Two telecommunications terminals can be connected "back to back" to form a digital loop carrier (DLC) network. A DLC network typically includes a remote terminal (RT) placed near a business or residence and a central terminal (CT) placed in a central exchange connected to a telecommunications switch. The RT and CT communicate over a single line carrying TDM signals. This configuration connects subscribers to the telecommunications switch.

A telecommunications terminal management system provides administrators and others with information about terminals aggregated at a site. Terminal information includes descriptions of the channel unit cards currently installed in the terminal.

A simple telecommunications terminal management system has a computer connected to a telecommunications terminal. The computer collects and displays information about the terminal. The computer can collect information by sending Transaction Language 1 (TL1) commands to the terminal. TL1 is a Bellcore language that defines different ASCII commands that telecommunications terminals can understand and process. For example, if the computer sends the terminal the TL1 command RTRV-EQUIP-ALL, the terminal would respond by sending back a TL1 ASCII message containing information describing installed equipment—namely, all of the channel unit cards presently installed in the terminal.

Administrators using DSC™ Communications Corporation's Liteview™ terminal management system manually initiated polling (e.g. sending TL1 retrieve messages) of a telecommunications terminal whenever the administrators wanted to update the system's knowledge of which cards a terminal held.

SUMMARY

In general, in one aspect, a system for managing telecommunications terminals includes at least one telecommunications terminal capable of receiving a set of telecommunications cards, the telecommunications terminal being programmed to autonomously generate messages that describe changes to the set of telecommunications cards, and a computer connected to the telecommunications terminal that builds a model of the telecommunications terminal based on messages received from the telecommunications terminal.

Embodiments of the system may include one or more of the following features. The system may include two or more telecommunications terminals connected to the computer. The system may receive autonomous messages from each of the connected telecommunications terminals. The telecommunications cards may be channel unit cards. Changes to the set of telecommunications cards that the terminal senses may include telecommunications card insertion and/or removal. The model may be a hierarchy of software objects. The system may insert new software objects into the model when no model software object corresponds to an inserted card. The system may display the model to an operator and allow the computer operator to interact with the model. The system may request a message or messages describing the set of telecommunications cards upon connection of the telecommunications terminal to the computer.

In general, in one aspect, a system for managing telecommunications terminals includes at least one telecommunications terminal capable of receiving a set of telecommunications cards, the telecommunications terminal being programmed to produce messages that describe the set of telecommunications cards in response to a request, and a computer connected to the telecommunications terminal, the computer being programmed to automatically request messages from the telecommunications terminal at a specified interval and to build a model of the telecommunications terminal based on the messages.

In general, in one aspect, a method for managing a telecommunications terminal system that includes at least one telecommunications terminal capable of receiving a set of telecommunications cards includes automatically sensing a change in the set of telecommunications cards present in the telecommunications terminal, and automatically updating a model of the telecommunications terminal based on the change.

Advantages may include one or more of the following.

The systems provides ease of use by accurately displaying the cards a terminal holds without administrator prompted polling.

The systems also provide interactive feedback to the administrator. For example, when a card is inserted or removed from the terminal, the administrator can be notified immediately.

The systems also enable a monitoring system, e.g. a server, to dynamically build and maintain an object model representative of terminal information. Because the autonomous messages are generated and transmitted automatically upon sense terminal card changes, the object model will provide a consistent and accurate representation of the terminal.

Other features and advantages will become apparent from the following description including the drawings and the claims.

DRAWING DESCRIPTIONS

DETAILED DESCRIPTION

Figure 1:
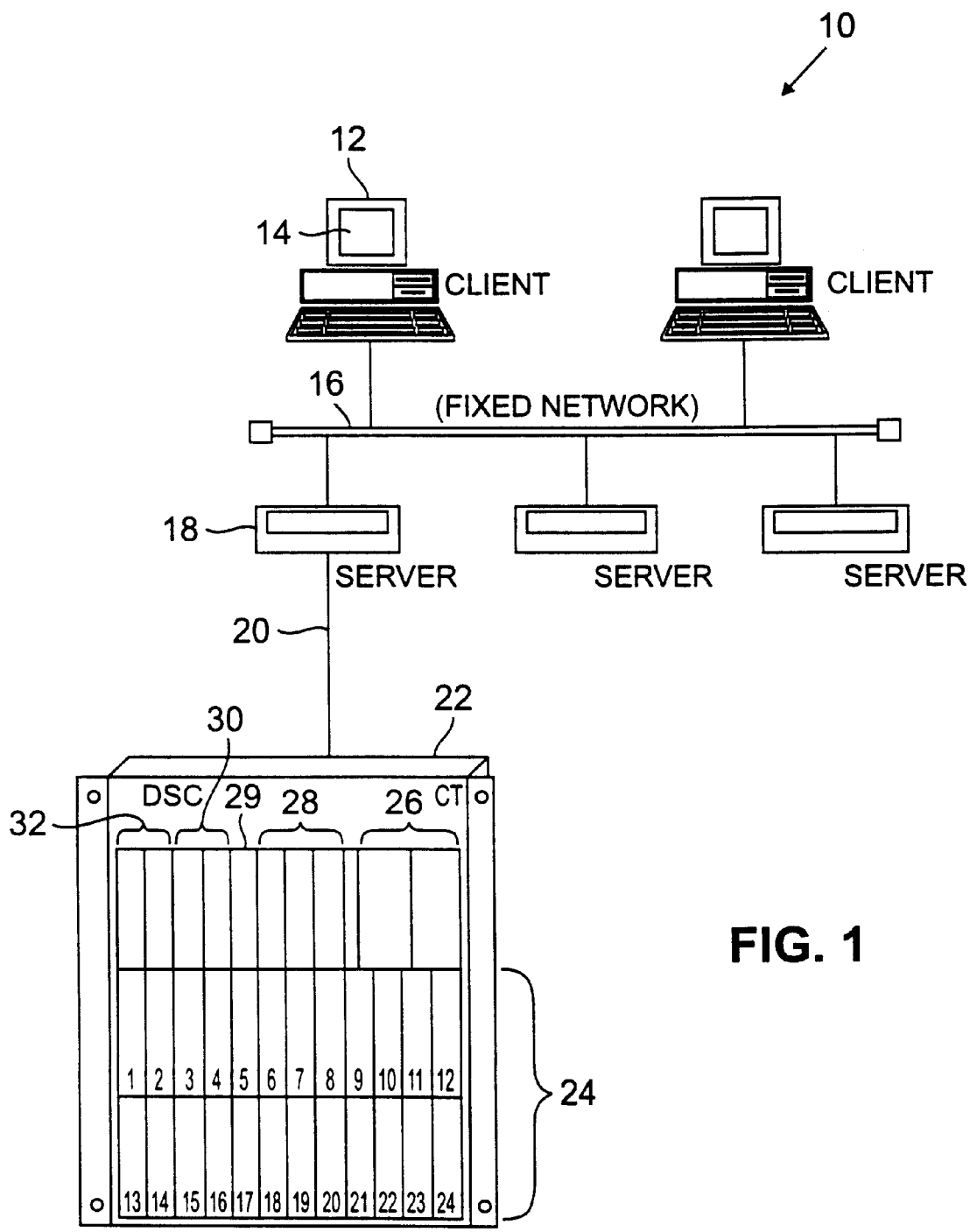
FIG. 1 is a diagram of a telecommunications terminal management system configuration.

Referring to FIG. 1, a telecommunications terminal management system 10 includes a telecommunications terminal 22, such as DSC™ Communication Corporation's Litespan-120, a Server 18, and a Client 12. A management system need not have these components as arranged in FIG. 1, for example, a single computer could contain both the Server 18 and Client 12.

The telecommunications terminal 22 includes slots that hold telecommunications cards. Different classes of slots hold different classes of cards (U.S. Ser. No. 09/001,066, filed Nov. 14, 1997, entitled "Telecommunications Terminal" describes a telecommunications terminal that supports interchangeability of different types of cards within a card class and is incorporated by reference). For example, each channel unit card slot can accept different types of channel unit cards 24. Each type of channel unit card serves a different type of subscriber line (e.g. POTS or ISDN). The telecommunications terminal 22 also provides Bandwidth Allocator, Processor, and Timing (BPT) slots that hold BPT cards 32. Each BPT card 32 includes a processor that monitors the terminal for configuration changes (e.g. card insertion or removal) and alarms (e.g. power failure). A subscriber bus (not shown) carries signals from each inserted card to the BPT card 26.

The Server 18 can process information from a number of different terminals, such as terminal 22. Each terminal 12 connects to a Server 18 through a numbered COM (Communication) port (not shown). A RS-232 serial expansion board attached to a Server 18 can provide additional COM ports.

The Server 18 sends and receives terminal 22 messages. The Server 18 can send a message requesting terminal messages that describe which telecommunications cards the terminal holds 22. The Server 18 can also be programmed to issue these requests at periodic intervals.

The terminal 22 can send messages to the Server 18 in response to Server 18 requests for terminal information. The Server 18 also may receive autonomous messages sent by the terminal 22. Autonomous messages are messages the terminal sends on its own initiative without a corresponding Server 18 request. Autonomous messages can indicate a state change in the terminal 22, such as the occurrence of a card insertion. The Server 18 uses messages sent by the terminal 22 to build an Object Model (discussed below) that includes objects representative of the terminal 22.

The Client 12 can connect to a variety of Servers 18 either directly (not shown) or indirectly, for example, over a computer network 16. The Client 12 receives information in the form of Operations (described below) from Servers 18 that describe the terminal's object information. The Client 12 builds its own Object Model from this information and presents the model to an administrator through a graphic user interface (GUI) displayed on the Client monitor 14.

Figure 2:
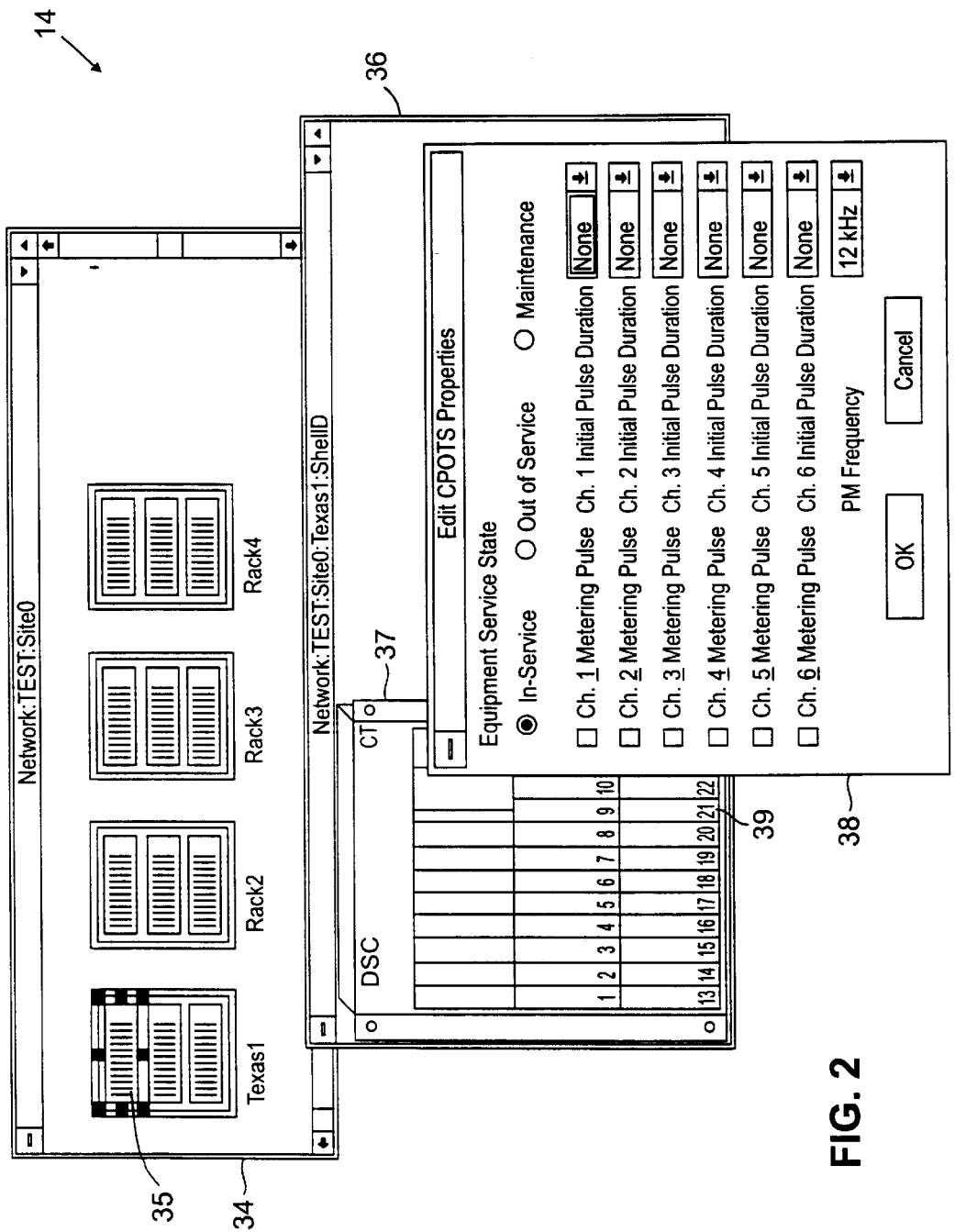
FIG. 2 is an sample terminal management system display.

Referring to FIG. 2, a Client monitor 14 presents telecommunications terminal system information to an administrator using a GUI. Through the GUI, the administrator can view and alter aspects of different telecommunications terminals and equipment at various sites.

The display shown in FIG. 2 shows telecommunications equipment at a particular site in windows 34, 36, and 38. Each window shows a different view of the telecommunications equipment. The site window 34 shows racks residing at the site. A rack shows shelves that correspond to telecommunications terminals. A rack does not physically exist outside the telecommunications terminal management system, but rather is a logical entity created for convenience by the administrator who uses appropriate features of the GUI to create racks and to assign different telecommunications terminals to shelves within the rack. The administrator can learn more about a particular rack shelf 35 by interacting with the GUI (i.e. double clicking on the rack shelf 35). The GUI presents the rack shelf 35 in a rack shelf window 36. The rack shelf window 36 shows a telecommunications terminal 37 and the cards 39 it holds. The rack shelf window 36 also can show other telecommunications equipment connected to a telecommunications terminal (not shown). For example, the rack shelf could show both the RT and CT terminals of a DLC loop. Further interaction with the GUI (i.e. double clicking on a particular card 39) can produce a card window 38. A card window 38 shows the different properties of an inserted terminal card. By altering a property through the card window 38, the administrator can generate a Client request for the Server to send a message to the terminal to alter operating properties of the terminal card (e.g. changing a card channel's initial pulse duration). The administrator can also pre-provision a telecommunications terminal (not shown). Pre-provisioning alters the Object Model in anticipation of a terminal equipment change and can generate an alarm if the anticipated event does not occur. For example, an administrator may pre-provision a telecommunications terminal slot to hold a POTS card. If, instead, an ISDN card is inserted, the telecommunications terminal might produce an alarm. The Client monitor 14 can be used to show additional or alternative views of terminal system data in addition to those shown in FIG. 2.

Figure 3:
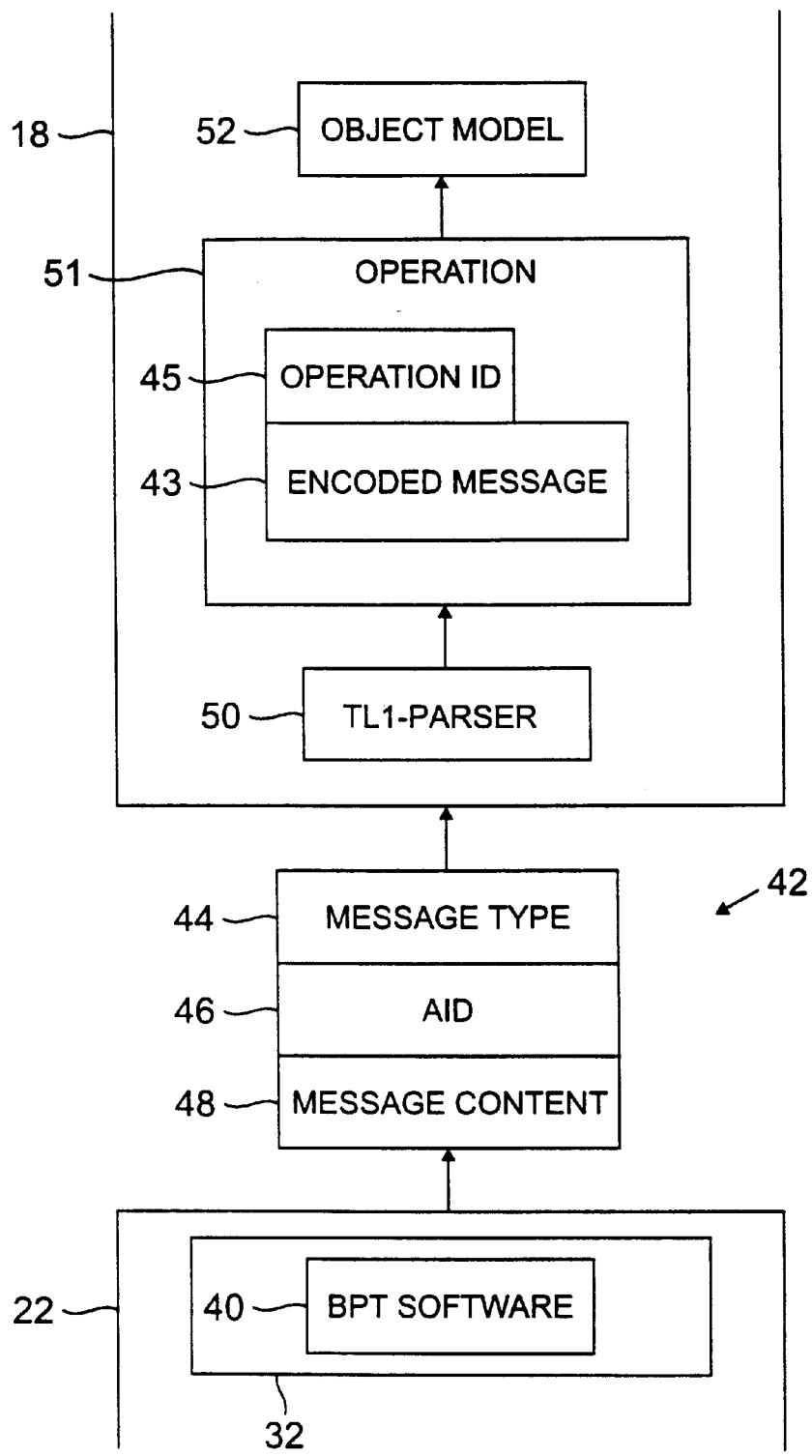
FIG. 3 is a diagram of a telecommunications terminal, a message produced by the terminal, and a Server.

Referring to FIG. 3, the terminal's BPT card 32 includes a processor that runs software 40 capable of monitoring the terminal 22 and sending autonomous messages, such as message 42, to the Server 18. For example, the BPT software 40 maintains a table correlating each slot in the terminal to the type of card, if any, the slot currently holds. The BPT software 40 routinely collects terminal 22 information to verify the table's contents. If the BPT software 40 detects a discrepancy between the table and the terminal information collected, perhaps due to card insertion or removal, the BPT software 40 creates an autonomous message 42 and sends it to the Server 18.

The autonomous message 42 includes message-type data 44, message content text 48, and AID (Access ID) data 46. The message-type data 44 indicates whether the message 42 was an autonomous message or in response to a Server request. The Server 18 must distinguish between autonomous messages since it otherwise assumes a message received after a request is in response to the request. The message content text 48 includes information about the state of the terminal. For example, an inserted POTS card could be described by TL1 ASCII text of "REPT DBCHG: PLUGIN: CT-1-7: CPOTSI1, CPOTSI1: HVR=1.1, BVR=3.1, SVR=2.1, SN=1910144:IS-NR ADA" which indicates the terminal slot receiving the card (slot 7), the type of card plugged into that slot (a variety of POTS card), and its serial number (191044). The AID data 46 indicates which terminal card(s) or component(s) the message content 48 describes.

The Server 18 includes a TL1-Parser 50 and an Object Model 52. The TL1-Parser is a software module that acts as a conduit between a message 42 sent by the terminal 22 and the Object Model 52. The TL1-Parser 50 creates an Operation 51 from the incoming message 42 by analyzing the message 42 and encoding its contents. An Operation 51 is a software object that stores the encoded message 43 and an Operation ID 45. The system creates an Operation ID 45 from the AID data 46. An Operation ID 45 identifies which rack, which shelf, which Fru (Field Replaceable Unit), and which card the message concerns. For example, an Operation ID of 1, 0, 10, 0 would indicate that the message concerns Rack 1, Shelf 0, Fru 10, and Card slot 0. The TL1-Parser 50 sends the Operation 51 to the Object Model 52.

Upon connection to a terminal 22, a Server 18 automatically sends TL1 retrieve commands (not shown) to the terminal 22 for descriptions of the cards the terminal 22 holds. The terminal 22 responds by sending TL1 messages 42 which the Server 18 converts to Operations to quickly build the Object Model 52 from scratch.

Figure 4:
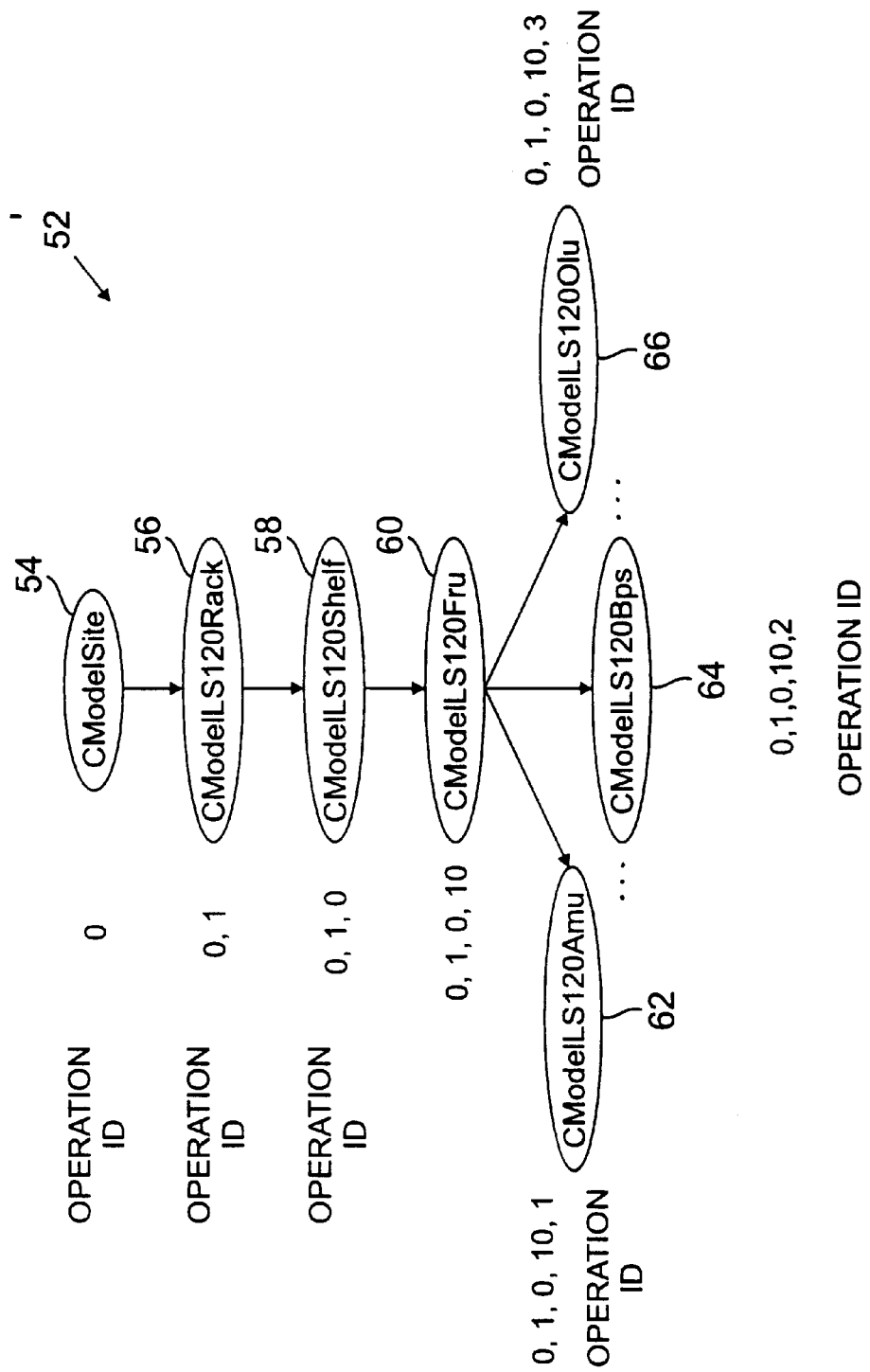
FIG. 4 is a diagram of an Object Model representing a telecommunications terminal site.

Referring to FIG. 4, the Object Model 52 is a hierarchy of software objects representing a terminal site. For example, CModelSite 54 represents an entire site of telecommunications terminal equipment, while CModelLS120Rack 56 represents a particular rack at the site. Many software objects can have child objects. For example, a site (CModelSite 54) could include a number of terminal racks instead of the single terminal rack (CModelLS120Rack) shown. Descending the hierarchy describes a site 54 in increasing detail from the site 54, to a rack 56 at the site 54, to a shelf 58 on the rack 56, to Fru 60 in the shelf 58, to a particular card 62, 64, and 66 in the Fru 60. Operations, described in regard to FIG. 3, are used to modify or update objects in the Object Model. An Operation uses its Operation ID data to traverse the hierarchy and deliver its encoded message to the software object that represents the telecommunications site object (e.g. representing a particular card) described by the message. For example, an Operation encoding a message describing an alarm for a terminal OLU (Optical Line Unit) transmission card might have an Operation ID of 0, 1, 0, 10, 3 indicating the message targets software object 66 positioned in Site 0, Rack 1, Shelf 0, and which is Fru 10's third child. The Operation is forwarded by each software object until the Operation finds its target software object and delivers the message.

Operations also can be used to dynamically allocate new software objects and thus further build the Object Model 52 (or build it from scratch) as different Operations signal insertion or removal of telecommunications equipment. For example, in one embodiment, the Object Model does not model empty terminal slots, thus, when an administrator inserts a card into a terminal, the resulting Operation describing the inserted card specifies an Operation ID that does not correspond to any software object present in the Object Model 52. The Object Model 52 handles this situation by creating a new software object of the appropriate type at the target Operation ID. For example, an Operation with an Operation ID of 0, 1, 0, 10, 4 would create a new child for Fru 10 since Fru 10 currently has only three children. Similarly, an Operation can remove an object from the Object Model 52 (e.g. when a card is removed) by specifying its AID and encoding a delete object message.

The Server continually checks the connection to a terminal. If the connection is severed then restored, the Server can issue requests for messages that describe the telecommunications cards the terminal holds and update the Object Model 52 to reflect changes made between severance and restoration.

In this manner, an administrator can view terminal information provided by the terminal management system in a timely manner, thus, enabling administrators to quickly see and respond to changes in different terminals. Additionally, since the Object Model builds itself as terminals produce autonomous messages or respond to automatically issued requests for messages, the administrator need do little configuring when starting the management system.

Other embodiments are within the scope of the following claims:

What is claimed is:

1. A system for managing telecommunications terminals comprising:
    at least one telecommunications terminal capable of receiving a set of telecommunications cards, the telecommunications terminal programmed to autonomously generate messages that describe changes to the set of telecommunications cards, and
    a computer connected to the telecommunications terminal that automatically builds a model of the telecommunications terminal based on messages received from the telecommunications terminal, wherein the model comprises a hierarchy of software objects and the computer is further programmed to insert one or more new software objects automatically into the model when no software object in the model corresponds to an inserted card described by a telecommunications terminal message describes.

2. The system of claim 1 further comprising two or more telecommunications terminals connected to the computer.

3. The system of claim 2 in which the computer receives autonomous messages from each of the connected telecommunications terminals.

4. The system of claim 3 in which the computer builds a model of each of the connected telecommunications terminals based on the messages received.

5. The system of claim 1 wherein the telecommunications cards comprise channel unit cards.

6. The system of claim 1 wherein a change to the set of telecommunications cards comprises telecommunications card insertion.

7. The system of claim 1 wherein a change in the set of telecommunications cards comprises telecommunications card removal.

8. The system of claim 1 wherein the computer is further programmed to display the model to an operator.

9. The system of claim 1 wherein the computer is further programmed to allow a computer operator to interact with the model.

10. The system of claim 1 wherein the computer is further programmed to request a message or messages describing the set of telecommunications cards upon connection of the telecommunications terminal to the computer and uses the message or messages to build the model based on the message or messages received from the telecommunications terminal.

11. A system for managing telecommunications terminals comprising:
    at least one telecommunications terminal capable of receiving a set of telecommunications cards, the telecoxmmunications terminal programmed to produce messages that describe the set of telecommunications cards in response to a request; and
    a computer connected to the telecommunications terminal, the computer being programmed to automatically request messages from the telecommunications terminal at a specified interval and to automatically build a model of the telecommunications terminal based on the messages, wherein the model comprises a hierarchy of software objects and the computer is further programmed to insert one or more new software objects into the model automatically when no software object corresponds to an inserted card described by the telecommunications terminal message.

12. The system of claim 11 wherein the computer is further programmed to update the model when the messages indicate that the telecommunications terminal holds a telecommunications card not represented in the model.

13. The system of claim 11 wherein the computer is further programmed to modify the model when the messages indicate that the telecommunications terminal does not hold a telecommunications card represented in the model.

14. The system of claim 11 wherein the computer is further programmed to display the model to an operator.

15. The system of claim 11 wherein the computer is further programmed to allow an operator to interact with the model.

16. A method for managing a telecommunications terminal system that includes at least one telecommunications terminal capable of receiving a set of telecommunications cards, the method comprising:

automatically sensing a change in the set of telecommunications cards present in the telecommunications terminal; and automatically updating a model of the telecommunications terminal based on the change, wherein updating the model of the telecommunications terminal comprises inserting one or more objects into the model automatically when no object in the model corresponds to an inserted card described by the message.

17. The method of claim 16 wherein automatically sensing a change comprises sensing card insertion.

18. The method of claim 16 wherein automatically sensing a change comprises sensing card removal.

19. The method of claim 16 wherein automatically sensing a change comprises receiving an autonomous message from the telecommunications terminal in the absence of a corresponding request.

20. The method of claim 16 wherein automatically sensing a change comprises requesting a message or messages describing the telecommunications cards present in the terminal, and comparing information in the message or messages to information in previous messages.

21. The method of claim 16 wherein updating a model of the telecommunications terminal comprises inserting objects into the model when no model object corresponds to an inserted card a message describes.

22. An electronic storage medium residing on a computer comprising instructions for causing the computer to automatically build a model from at least one message received from at least one connected telecommunications terminal, wherein the at least one message is sent by the telecommunications terminal for which the model is being built upon sensing a telecommunications card insertion or removal, and updating the model of the telecommunications terminal comprises inserting one or more objects into the model automatically when no object in the model corresponds to an inserted card described by the message.

23. The electronic storage medium of claim 22 wherein the instructions cause the computer to display the model to an operator and to automatically update the display as the model changes.

* * * * *